(12) United States Patent
Muldoon

(10) Patent No.: US 6,861,843 B2
(45) Date of Patent: Mar. 1, 2005

(54) SAFE FLUID DETECTION IN AC POWERED DEVICES

(76) Inventor: Alfred Wade Muldoon, 2603 Willa Dr., St. Joseph, MI (US) 49085

( * ) Notice: Subject to any disclaimer, the term of this patent is extended or adjusted under 35 U.S.C. 154(b) by 177 days.

(21) Appl. No.: 10/273,719

(22) Filed: Oct. 18, 2002

(65) Prior Publication Data

US 2004/0075438 A1 Apr. 22, 2004

(51) Int. Cl.[7] .......................... G01N 27/02; G01R 27/08
(52) U.S. Cl. ..................... 324/439; 324/444; 324/446; 324/691
(58) Field of Search ................. 324/439, 444, 324/446, 447, 448, 449, 691, 693, 696

(56) References Cited

U.S. PATENT DOCUMENTS

| | | | |
|---|---|---|---|
| 4,808,931 A | * | 2/1989 | Ling .......................... 324/444 |
| 5,543,717 A | * | 8/1996 | Kordas ........................ 324/444 |
| 5,854,557 A | * | 12/1998 | Tiefnig ........................ 324/700 |

* cited by examiner

Primary Examiner—Anjan Deb
Assistant Examiner—John Teresinski

(57) ABSTRACT

An AC powered device detecting the presence of a conducting fluid using a source of detecting current through the fluid other than a grounded supply. All paths between the source of current and the fluid include large impedances, termed protecting impendances. The protecting impedances are sufficient to prevent the fluid from posing a shock hazard should the source have or develop a connection to AC. Protection does not rely on the isolation of the source from AC. The source may be either AC or an ungrounded supply generated by the device. Using AC as the source of detecting current eliminates the need to generate an ac signal to limit plating. The sensing circuit may remain isolated by using AC leakage current to drive the sensing means. Fluid detection is possible in devices in which the fluid is in contact with a probe, typically the chassis, whether the probe is grounded as intended or is floating.

20 Claims, 2 Drawing Sheets

SAFE FLUID DETECTION IN AC POWERED DEVICES

CROSS-REFERENCE TO RELATED APPLICATIONS

Not Applicable

STATEMENT REGARDING FEDERALLY SPONSORED RESEARCH

Not Applicable

REFERENCE TO SEQUENCE LISTINGS

Not Applicable

BACKGROUND OF THE INVENTION

The present invention relates to detection of a conducting fluid between probes and shock prevention in devices powered by AC. Herein AC refers to the voltage supplied by the electric company, typically at 60 hz in US, while ac refers to any other alternating current signal.

Prior approaches rely on the isolation of the source of detecting current from AC to prevent the fluid from being a shock hazard. As long as isolation is maintained the fluid is safe. To prevent an isolating component failure or other short causing the detection circuit to be "live" the approaches in U.S. Pat. Nos. 3,498,085, 4,380,091 and 4,612,949 use a grounded supply as a source of detecting current. If the isolation fails a fuse or equivalent opens maintaining isolation. Herein ground unless qualified refers to the ground of the AC source. Further any node not directly connected to the ground of the AC source is ungrounded.

The approaches in U.S. Pat. Nos. 4,903,530 and 5,493,877 use an ungrounded supply as a source of detecting current relying solely on the isolation of a transformer to prevent shock. If a short causes isolation failure the detection circuit becomes "live". In both patents a floating supply voltage is directly tied to the fluid meaning contact with the fluid could result in shock or worse should the detection circuit become "live".

In U.S. Pat. Nos. 4,182,363 and 5,841,028 it is unclear whether the inventor intended to ground the source of detecting current. Neither patent mentions separating the source of the detecting current and the fluid with sufficient impedance to prevent shock. U.S. Pat. No. 4,182,363 uses a direct connection between circuit ground and the fluid which is not safe in the event of isolation failure if the supply is not grounded.

Unfortunately a proper connection to ground can not always be assumed, particularly in consumer installed devices. Installation resulting in an improperly grounded device is so widespread that appliance manufacturers conventionally do not ground control circuits, only the chassis of the device is grounded. The control supply voltages are floating to prevent an improperly grounded chassis from becoming "live" in the event of isolation failure. Prior approaches have not addressed a device in which the sensing circuitry is not grounded and the fluid is connected to a probe, typically the chassis, that is grounded if correctly installed and floating if installed without a proper ground.

Further previous approaches such as in U.S. Pat. Nos. 4,380,091 and 5,841,028 that use ac current through the fluid must generate the ac signal. Generating ac signals requires additional components, complicating circuit design and adding expense.

It is therefore desirable to create a means in addition to, or in place of isolating components to ensure the safety of fluid detection when a source other than a grounded supply is used to detect fluid. Preferably the device should not incur the expense of generating an ac signal for the detection circuit. Further in applications where one probe, typically the chassis is nominally grounded it should allow the sensing circuitry to correctly detect the fluid whether or not the reference probe is grounded.

SUMMARY OF INVENTION

The present invention uses a source of detecting current other than a grounded supply to detect the presence of fluid between probes. Current from the source flows through the fluid when the fluid connects probes. Hence when the fluid is present the fluid electrically connects the probes. The invention limits the current between the detecting source and the fluid rather than relying solely on the isolation of the source. The fluid and any ungrounded node of the detecting source are separated by protecting impedance, which is sufficient to prevent the fluid from posing a shock hazard should the source have or develop a direct connection to AC.

It is preferred to have sufficient impedance between the sensing circuitry and AC to prevent any node of the detecting circuitry from posing a shock hazard and providing an additional layer of protection. This layer of protection is commonly provided by but not limited to the isolating components of a power supply.

The protecting impedance creates distal nodes. Distal nodes and distal components are located at the opposing end of paths including protecting impedance originating at the fluid. If a distal node has or develops a direct connection to AC the protecting impedance limits the current through the fluid to a safe level should a human contact it.

The source of detecting current used may be either AC or an ungrounded supply, one generated in the device, typically at a lower voltage. AC may safely be used to drive the detecting circuit by making any AC node that could pose a shock hazard a distal node. When an ungrounded supply is used for detection all its nodes must be distal nodes.

The protecting impedance is provided by either open circuits or components of sufficient impedance to limit current from the fluid through a grounded operator to a safe level, preferably below the threshold of sensation. Multiple components in series each capable of limiting the current may be employed establishing layers of protecting.

Probes may be protecting impedance. While reactive components may be used as protecting impedance preferred embodiments use resistors adding reactive components as necessary to block DC or noise. Resistors are preferred due to their greater reliability and lower cost than reactive components.

The restriction to the use of ungrounded supplies of the present invention applies only to the source of detecting current. Other supplies in embodiments of the present invention maybe grounded. Typically this occurs when AC is the source of detecting current and the supply source of the sensing means is grounded.

In many cases AC can be used as the source of detecting current while maintaining the isolation of the detecting circuit from the AC power lines by using intrinsic impedance to complete the detecting loop. If necessary the AC signal may be strengthened by the addition of electrical components connecting the sensing circuit to AC. While including a path to AC through a component means the circuit is not isolated, using components that are of sufficient impedance prevents shock should any circuit node be contacted. When AC is the source of detecting current this impedance is protecting impedance as it lies between the fluid and AC.

In applications where an ungrounded supply is the source of detection current, no direct connection between the source, including circuit ground and the fluid is allowed. All paths between the supply and the fluid must include protecting impedance since a short of any supply node to AC renders all supply nodes effectively "live".

When using an ungrounded supply for detection current it is generally necessary to limit the amount of AC noise received by the high impedance current loop required by the present invention. Alternatively the AC noise may be filtered or ignored by the sensing means by using a signal of sufficiently different frequency.

Regardless of the source of detecting current it is preferred that all paths between any source and the fluid include protecting impedance, preventing shock from the fluid should any source short to AC. This is preferably done by making all components other than the probes and protecting impedances distal.

The very low currents used by the present invention limit plating on the probes. Use of ac, preferably AC signals further limits plating, reactive components may be included to block dc. Probes may be placed at the desired levels or a probe(s) which varies circuit impedance with the amount of probe contacted by the fluid may be employed to produce analog fluid detection.

DETAILED DESCRIPTION OF THE INVENTION

Although both the following embodiments use 120 v AC as the source of current used to detect fluid in washing machines it is to be understood that the inventor contemplates the invention being applied to other devices powered by the same or other AC voltage, using AC or an ungrounded supply as a source of detecting current.

Figure 1:
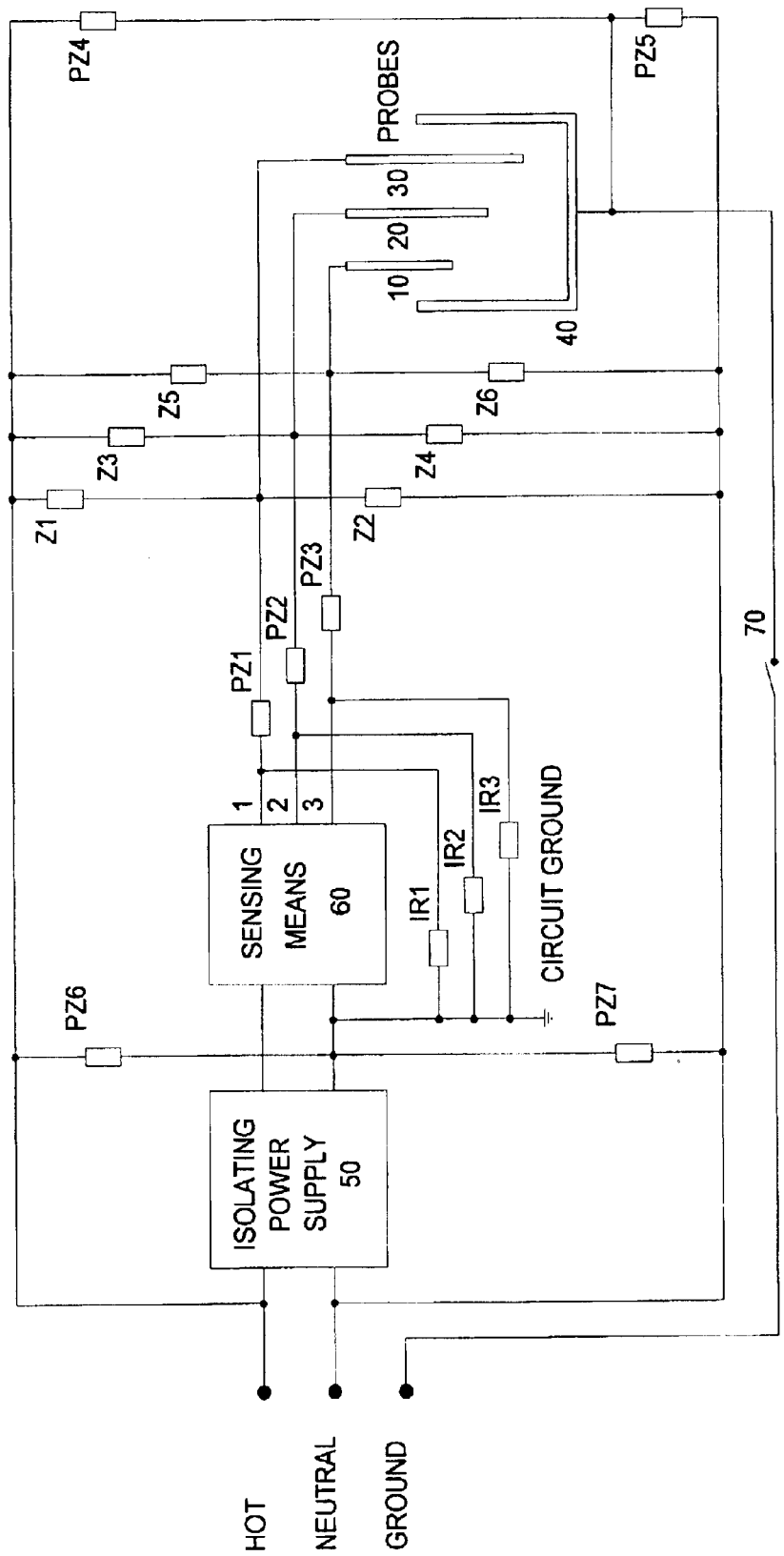
FIG. 1 shows circuitry with an ungrounded supply using AC to detect fluid between the probes of a washer.

The preferred embodiment senses the presence of water in a washing machine having three fill levels using the circuit in FIG. 1. Probes 10–30 are used to sense water at levels high, medium and low respectively. The clothes basket and chassis of the washer are in common, together they form probe 40. When present the water lowers the impedance between the probes. The sensing means 60 detects the change in impedance to determine the water level.

When the washer is correctly installed the connection represented by 70 grounds probe 40. When the connection to ground is not made, connection 70 open, probe 40 is floating. The sensing means 60 functions correctly both when the chassis 40 is grounded and when it is floating.

The impedances PZ4–PZ7 and Z1–Z6 are not composed of electrical components, they are intrinsic. While intrinsic impedances are commonly ignored—modeled as open circuits, they are present in all AC powered devices. These impedances while large, are finite and provide sufficient current to drive the sensing means 60.

The source of detecting current is the AC source. PZ4–PZ7 and Z1–Z6 are protecting impedances as they lie in paths between the source and the fluid. The sensing means 60 uses the leakage current between the AC source and the nodes of the detection circuit. Protecting impedances PZ4–PZ7 provide the leakage current. As there are no components providing a direct path between the AC power lines and the detecting circuit all the nodes of the detecting circuit are isolated except hot and neutral. PZ4 and PZ5 are the intrinsic impedances between AC and the chassis and basket 40. The intrinsic impedances between the isolated nodes of the sensing means 60 and AC are modeled as PZ6 and PZ7.

The intrinsic impedances Z1–Z6 are much larger than the direct connection provided by 70, if grounded, or PZ4–PZ5 when floating given the much smaller surface area of the probes and connecting wires compared to the surface area of the chassis and basket 40. Protecting impedances Z1–Z6 produce AC noise on the inputs 1–3. Resistors IR1–IR3 reduce the input impedance of inputs 1–3 so that this noise does not trigger the sensing means 60.

The sensing means 60 is isolated from the AC power lines by power supply 50. Together PZ4–PZ7 and the isolation provided by the supply 50, when functional, are sufficient to prevent shock. The inclusion of protecting impedances PZ1–PZ3 makes all the nodes of the detecting circuit not directly connected to the probes distal nodes. If the impedances of PZ1–PZ3 were not sufficient to be protecting impedance the only distal nodes are the detecting source nodes, hot and neutral. With PZ1–PZ3 the safety of the fluid is not dependent on the functionality of the isolation componentry of supply 50.

Protecting impedances PZ1–PZ3 are each composed of a pair of resistors in series. Each resistor is sufficient to provide protection thus maintaining safety in the unlikely event both a resistor shorts and the isolation of 50 fails. In this embodiment should nodes 1–3 become directly connected to AC, a perfectly conducting fluid cover probes 10–40, and a grounded operator contact the fluid the current through the operator will be below the threshold of sensation.

The voltage on inputs 1–3 is the fraction of the AC source voltage determined by the ratio of input impedance over the total impedance of the input-source current loop. The total input-source current loop impedance becomes much smaller when the probe of the input is connected to the chassis 40 by water. Loop impedance is reduced whether or not 40 is grounded.

The amplitude of an input signal is increased when loop impedance is reduced. The signal strength when the probe of an input is connected to 40 by fluid depends on the state of the connection 70 and the polarity of the connections to the AC source. However in all cases the amplitude of the signal is sufficient to cause an input to be read as having a 60 hz signal.

In embodiments where the signal produced by leakage current is not large enough to trigger the sensing means 60 the signal may be increased by lowering the loop impedance. The preferred method is to lower the impedances PZ6 and PZ7 by including resistors between both hot and neutral and circuit ground. While the presence of PZ1–PZ3 ensures the safety of the fluid, the value of the resistors is preferably sufficient to ensure PZ6–PZ7 have sufficient impedance to prevent circuit nodes from posing a shock hazard.

Maintaining both PZ6 and PZ7 as protecting impedances ensures that circuit nodes will not pose a shock hazard regardless of the correct connection to hot and neutral i.e.—if hot and neutral are reversed in installation the circuit is still protected and still functions.

Alternatively or additionally protecting impedances PZ4 and PZ5 can be lowered using electrical components. These components must be of sufficient impedance to prevent shock since the chassis is in direct contact with the fluid. Either method lowers the loop impedance increasing the signal to noise ratio. The signal to noise ratio may also be increased by shielding and/or routing the probe connections to increase the impedances Z1–Z6.

If the washing machine were a commercial unit, professionally installed, the connection 70 to ground could be safely assumed. In such cases the control in FIG. 2 may be used. Again the source of current for detection is AC not the supply voltages generated by 50. The probes are located as they are in the consumer washer. Since a proper ground is assured supply voltages can be grounded as shown in FIG. 2.

This control also uses protecting impedances PZ1–PZ3 to prevent shock should a short to AC bypass the fuse (not shown) of 50 or should electronics failures cause the fuse not to blow in the event of isolation failure. The intrinsic impedances PZ4–PZ7 while present are not shown in FIG. 2 because they do not effect the common ground detection circuit. Input resistors IR1–IR3 have been removed increasing the impedance of inputs 1–3.

Increasing input impedances allows the intrinsic impedances Z1–Z6 to produce a 60 hz signal on the inputs using leakage current when fluid is not present on a probe of an input. When water connects the inputs to the grounded chassis 40 input signals are low signaling the presence of water.

Figure 2:
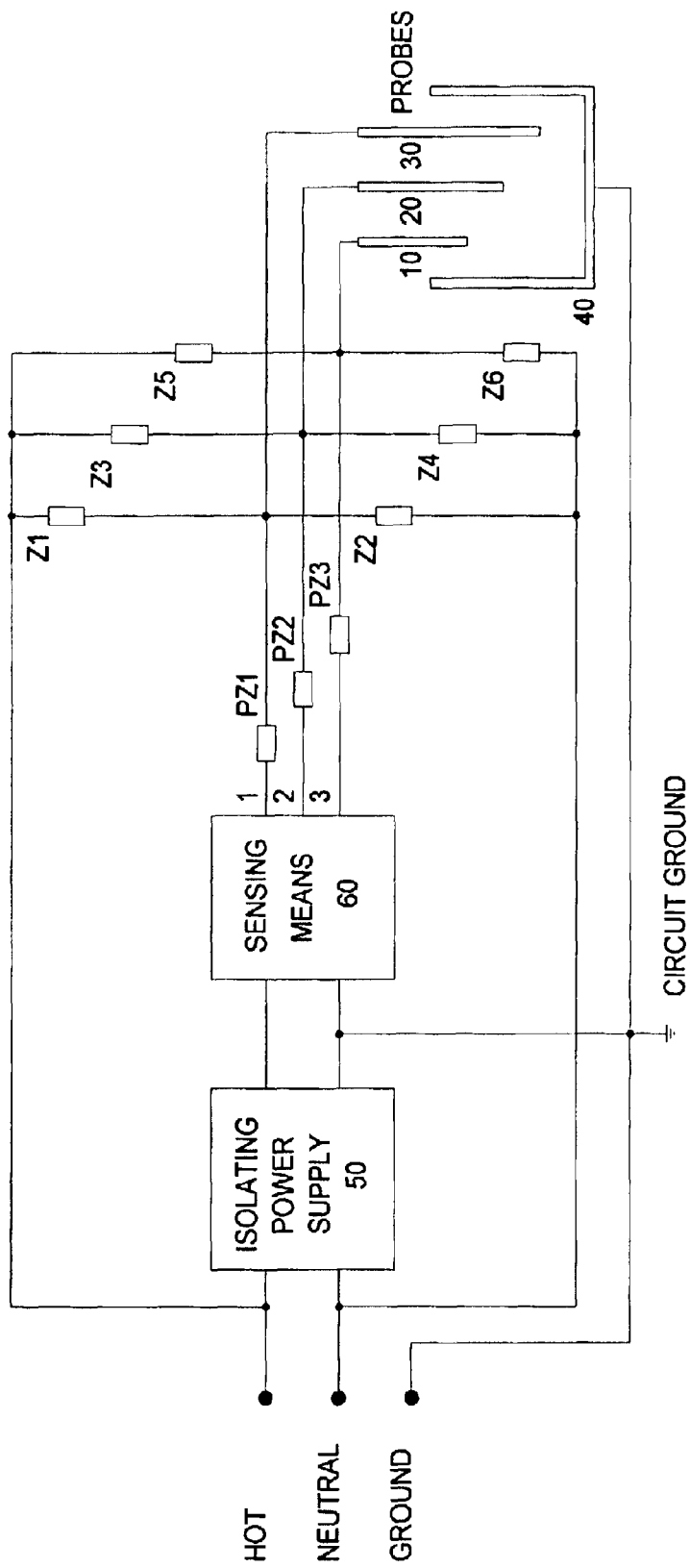
FIG. 2 shows circuitry with a grounded supply using AC to detect fluid between the probes of a washer.

In FIG. 2 the impedances Z1–Z6 are again protecting impedances limiting the current through a grounded operator contacting the fluid to below the threshold of sensation. Unlike the circuit in FIG. 1 the circuit will not function if Z1–Z6 were infinite. This circuit makes use of the AC noise present on inputs 1–3 as a result of Z1–Z6.

Both of these controls use AC as the driving voltage of the sensing means producing an ac probe current without the need to generate both positive and negative voltages. The placement of protecting impedances, PZ1 et al., between the fluid and all other circuit components establishes all other circuit nodes as distal nodes thus ensuring that a failure of the isolating components or short to any node other than the probes will not cause the fluid to pose a shock hazard.

What is claimed is:

1. An AC powered device including at least one pair of probes, said device;
   including sensing means to determine if said probes are electrically connected by a fluid,
   using a source of fluid detecting current other than a grounded supply,
   including protecting impedance between any ungrounded node of said source and said fluid,
   said source causing current to flow through said fluid when said fluid electrically connects said probes.

2. The device in accordance with claim 1 in which the resistance of said protecting impedance, implemented with components, is sufficient to prevent shock.

3. The device in accordance with claim 1 in which all components of said device other than said probes or said protecting impedances are distal components.

4. The device in accordance with claim 3 in which the resistance of said protecting impedance, implemented with components, is sufficient to create said distal components.

5. The device in accordance with claim 1 in which there is sufficient impedance between said AC and said sensing means to ensure that touching any node of said sensing means does not pose a shock hazard.

6. The device in accordance with claim 5 in which the resistance of said protecting impedance, implemented with components, is sufficient to prevent shock.

7. The device in accordance with claim 5 in which all components of said device other than said probes or said protecting impedances are distal components.

8. The device in accordance with claim 7 in which the resistance of said protecting impedance, implemented with components, is sufficient to create said distal components.

9. An AC powered device including at least one pair of probes, said device;
   including sensing means to determine if said probes are electrically connected by a fluid,
   using an ungrounded supply as a source of fluid detecting current,
   including protecting impedance, said protecting impedance ensuring that touching said fluid does not pose a shock hazard without requiring the presence of functional isolation componentry between said AC and said supply,
   said source causing current to flow through said fluid when said fluid electrically connects said probes.

10. The device in accordance with claim 9 in which the resistance of said protecting impedance, implemented with components, is sufficient to ensure that touching said fluid does not pose a shock hazard without requiring the presence of said functional isolation componentry.

11. The device in accordance with claim 9 in which there is sufficient impedance between said AC and said sensing means to ensure that touching any node of said sensing means does not pose a shock hazard.

12. The device in accordance with claim 11 in which the resistance of said protecting impedance, implemented with components, is sufficient to ensure that touching said fluid does not pose a shock hazard without requiring the presence of said functional isolation componentry.

13. An AC powered device including at least one pair of probes, said device;
   including sensing means to determine if said probes are electrically connected by a fluid,
   using said AC as a source of fluid detecting current through said probes,
   including protecting impedance, said protecting impedance ensuring that touching said fluid does not pose a shock hazard without requiring the presence of functional isolation componentry,
   said source causing current to flow through said fluid when said fluid electrically connects said probes.

14. The device in accordance with claim 13 in which the supply nodes of said sensing means are not grounded.

15. The device in accordance with claim 14 in which one of said probes is a nominally grounded, said sensing means being capable of determining if said probes are electrically connected by a fluid regardless if said nominally grounded probe is grounded.

16. The device in accordance with claim 14 in which there is sufficient impedance between said AC and said sensing means to ensure that touching any node of said sensing means does not pose a shock hazard.

17. The device in accordance with claim 16 in which one of said probes is nominally grounded, said sensing means being capable of determining if said probes are electrically connected by a fluid regardless if said nominally grounded probe is grounded.

18. The device in accordance with claim 17 in which said nominally grounded probes is in common with the chassis of said device.

19. The device in accordance with claim 13 in which a node of the supply of said sensing means is grounded.

20. The device in accordance with claim 19 in which there is suffcient impedance between said AC and said sensing means to ensure that touching any node of said sensing means does not pose a shock hazard.

* * * * *